United States Patent
Hietaniemi et al.

(10) Patent No.: US 9,279,217 B2
(45) Date of Patent: Mar. 8, 2016

(54) METHOD FOR MAKING OF PAPER, TISSUE, BOARD OR THE LIKE

(71) Applicant: KEMIRA OYJ, Helsinki (FI)

(72) Inventors: Matti Hietaniemi, Espoo (FI); Kimmo Strengell, Espoo (FI); Asko Karppi, Turku (FI); Marko Kolari, Vantaa (FI); Jaakko Ekman, Helsinki (FI)

(73) Assignee: KEMIRA OYJ, Helsinki (FI)

( * ) Notice: Subject to any disclaimer, the term of this patent is extended or adjusted under 35 U.S.C. 154(b) by 0 days.

(21) Appl. No.: 14/380,323

(22) PCT Filed: Feb. 22, 2013

(86) PCT No.: PCT/FI2013/050201
§ 371 (c)(1),
(2) Date: Aug. 21, 2014

(87) PCT Pub. No.: WO2013/124542
PCT Pub. Date: Aug. 29, 2013

(65) Prior Publication Data
US 2015/0041092 A1 Feb. 12, 2015

(30) Foreign Application Priority Data
Feb. 22, 2012 (FI) ...................................... 20125204

(51) Int. Cl.
*D21H 17/66* (2006.01)
*D21H 17/28* (2006.01)
(Continued)

(52) U.S. Cl.
CPC .............. *D21H 17/66* (2013.01); *D21H 11/14* (2013.01); *D21H 17/28* (2013.01); *D21H 17/37* (2013.01); *D21H 17/55* (2013.01); *D21H 17/63* (2013.01); *D21H 27/002* (2013.01)

(58) Field of Classification Search
CPC ....... D21H 17/66; D21H 17/55; D21H 17/63; D21H 17/28; D21H 17/37; D21H 27/002; D21H 11/14; D21H 21/10
See application file for complete search history.

(56) References Cited

U.S. PATENT DOCUMENTS 5,002,633 A * 3/1991 Maxham ........................... 162/5
5,126,014 A 6/1992 Chung
(Continued)

FOREIGN PATENT DOCUMENTS

CN 1429299 A 7/2003
CN 101525856 9/2009
(Continued)

*Primary Examiner* — Jose Fortuna
(74) *Attorney, Agent, or Firm* — Thomas Horstemeyer, LLP (57) ABSTRACT

The invention relates to a method for making of paper, tissue, board or the like by using recycled fiber material as a raw material. The method comprises following steps: pulping recycled paper, board or the like in a pulper and obtaining a pulp flow comprising (i) an aqueous phase and (ii) at least recycled fibers and starch having low molecular weight, which are dispersed in the aqueous phase; adding a coagulant agent to the pulp flow or to an aqueous process flow comprising starch having low molecular weight; allowing the coagulant agent to interact with the starch having low molecular weight and optionally forming aggregates; and adding at least one flocculating agent, after the addition of the coagulant agent, to any flow, which comprises interacted coagulant agent, and forming a treated flow with starch comprising agglomerate(s); retaining at least part of the said aggregates and/or the said agglomerates to the fibers or to a web, which is formed.

20 Claims, 3 Drawing Sheets (51) Int. Cl.
*D21H 11/14* (2006.01)
*D21H 27/00* (2006.01)
*D21H 17/37* (2006.01)
*D21H 17/55* (2006.01)
*D21H 17/63* (2006.01)

(56) References Cited

U.S. PATENT DOCUMENTS

| | | | | |
|---|---|---|---|---|
| 5,676,796 A * | 10/1997 | Cutts | | 162/158 |
| 5,749,954 A * | 5/1998 | Law et al. | | 106/282 |
| 5,824,531 A | 10/1998 | Outtrup et al. | | |
| 5,856,164 A | 1/1999 | Outtrup et al. | | |
| 5,942,087 A | 8/1999 | Pruszynski | | |
| 5,958,188 A | 9/1999 | Heard et al. | | |
| 6,027,610 A * | 2/2000 | Back et al. | | 162/111 |
| 6,074,527 A * | 6/2000 | Hsu et al. | | 162/111 |
| 6,358,364 B2 * | 3/2002 | Keiser et al. | | 162/181.6 |
| 6,413,363 B1 * | 7/2002 | Hsu et al. | | 162/4 |
| 6,616,807 B1 | 9/2003 | Dyllick-Brenzinger et al. | | |
| 6,712,933 B2 | 3/2004 | Karve et al. | | |
| 6,770,170 B2 * | 8/2004 | Covarrubias | | 162/164.1 |
| 7,011,729 B2 * | 3/2006 | Strong et al. | | 162/176 |
| 7,226,526 B2 * | 6/2007 | Strong et al. | | 162/176 |
| 7,407,563 B2 * | 8/2008 | Hietaniemi | | 162/264 |
| 8,052,841 B2 * | 11/2011 | Ahlgren et al. | | 162/181.7 |
| 8,142,616 B2 * | 3/2012 | Brogdon et al. | | 162/179 |
| 8,758,562 B2 * | 6/2014 | Krapsch et al. | | 162/141 |
| 8,790,493 B2 * | 7/2014 | Solhage et al. | | 162/168.3 |
| 8,916,024 B2 * | 12/2014 | Ban et al. | | 162/72 |
| 8,936,698 B2 * | 1/2015 | Karppi et al. | | 162/164.3 |
| 2004/0221977 A1 * | 11/2004 | Vergara Lopez | | 162/158 |
| 2006/0008513 A1 * | 1/2006 | Holbert et al. | | 424/443 |
| 2014/0242191 A1 * | 8/2014 | Kolari et al. | | 424/641 |
| 2015/0068696 A1 * | 3/2015 | Reed | | D21H 17/29 162/132 |
| 2015/0068697 A1 * | 3/2015 | Karppi et al. | | 162/164.3 |
| 2015/0122442 A1 * | 5/2015 | Caldeman | | D21C 9/18 162/202 |
| 2015/0197889 A1 * | 7/2015 | Beaupre | | D21H 17/07 162/158 |

FOREIGN PATENT DOCUMENTS

| | | |
|---|---|---|
| GB | 2026571 A | 2/1980 |
| JP | 2005290565 A | 10/2005 |
| WO | 0003094 A1 | 1/2000 |
| WO | WO 2004092482 A1 * | 10/2004 |
| WO | WO 2013124542 A1 * | 8/2013 |

* cited by examiner

METHOD FOR MAKING OF PAPER, TISSUE, BOARD OR THE LIKE

CROSS-REFERENCE TO RELATED APPLICATIONS

This application is the 35 U.S.C. §371 national stage of PCT Application No. PCT/FI2013/050201, filed Feb. 22, 2013, which is herein incorporated by reference in its entirety and which also claims priority to, and the benefit of, Finnish Patent Application No. 20125204, filed Feb. 22, 2012, which is herein incorporated by reference in its entirety.

FIELD OF THE INVENTION

The invention relates to a method for making of paper, tissue, board or the like, from recycled fibre material according to the preamble of the enclosed independent claim.

BACKGROUND

Recycled fibre material, such as old corrugated containerboard (OCC), is commonly used as raw material for paper or board. The recycled fibre material comprises in addition to the fibres a number of other substances. Particulate foreign material is separated from the pulp in the pulper or at the screening. Some substances are naturally retained on the fibres and do not disturb the process. Other substances, such as stickies, may be separated from the pulp at the screening and removed from the process.

Typically recycled fibre material comprises starch, which has low molecular weight. This starch originates from the surface sizing of the paper or board, and it retains poorly on the fibres as it typically has no charge at all or it has a slightly anionic charge. Due to its small size it is not effectively separated at the screening either. Thus the low molecular weight starch remains in the water circulation of the pulping and papermaking processes or it is removed together with the screen effluent to the wastewater treatment. In the water circulation the starch increases the risk for microbial growth, as it is suitable nutritive substance for various microbes. Microbes may affect both the functioning of the chemistry of papermaking and/or the quality of the end product. High microbial activity can lower the pH and have a marked effect on wet-end chemistry. High microbial activity can also create strong odours that may be a nuisance or even a danger to operating personnel, and also destructive for product quality in packaging grades. Slime formation, biofilms, on the surfaces of tanks and machine frames leads to paper defects, such as spots and holes, or web breaks when slime lumps are sloughing off.

In the wastewater treatment the low molecular weight starch increases the COD load of the water to be treated, i.e. it increases the wastewater treatment costs.

The amount of low molecular weight starch in the recycled fibre material may be relatively high, for example 1-3% of the total weight of the recycled fibre. When the starch is lost to the water circulation during pulp preparation process the yield of the process is naturally decreasing. Therefore a process that would prevent the starch enrichment to the water circulation and assist its retention to the recycled fibres would provide numerous advantages.

SUMMARY

An object of this invention is to minimise or even eliminate the disadvantages existing in the prior art.

An object of the invention is also to provide a method with which the amount of low molecular weight starch may be reduced in the water circulation when pulping recycled fibre material.

A further object of the invention is to provide a method with which the retention of starch, especially low molecular weight starch, is improved.

These objects are attained with the invention having the characteristics presented below in the characterising part of the independent claim.

Typical method according to the present invention for making of paper, tissue, board or the like, by using recycled fibre material as a raw material, the method comprising following steps:

pulping recycled paper, board or the like in a pulper and obtaining a pulp flow comprising (i) an aqueous phase and (ii) at least recycled fibres and starch having low molecular weight, which are dispersed in the aqueous phase;

adding a coagulant agent to the pulp flow or to an aqueous process flow comprising starch having low molecular weight;

allowing the coagulant agent to interact with the starch having low molecular weight and optionally forming aggregates; and adding at least one flocculating agent, after the addition of the coagulant agent, to any flow, which comprises interacted coagulant agent, and forming a treated flow with starch comprising agglomerate(s);

retaining at least part of the said aggregates and/or the said agglomerates to the fibres or to a web, which is formed.

Now it has been surprisingly found out that low molecular weight starch in the recycled pulp may be agglomerated by addition of a coagulant agent followed by the addition of a flocculating agent. Thus the low molecular weight starch interacts first with the coagulant agent and then with the flocculating agent and forms agglomerates, or it is attached to agglomerates, which are large enough to be retained on the fibres or to the formed web. Furthermore, by selecting suitable coagulant agents and flocculating agents the agglomerates may even have surface charges that assist in their retention on the fibres. It has been noticed that the amount of low molecular weight starch in the circulating process water is clearly reduced, when the chemical additions according to the present invention is performed. Furthermore, the overall process yield is improved when more of the starch in the recycled fibre material can be retained to the fibres and consequently, to the formed board or the paper web. Still further, it may be possible to reduce the amount of surface sizing later in the production process, as the retained starch may improve the strength properties of the formed board or paper.

According to one preferred embodiment of the invention the COD value of the treated flow is reduced with at least 10%, preferably at least 20%, more preferably at least 40%, from the COD value of the aqueous phase of the pulp flow or from the COD value of the aqueous process flow before the addition of the coagulant agent.

In this application recycled fibre material means recycled paper, recycled board and/or old corrugated containerboard (OCC), which comprise fibres and starch, optionally also other constituents. Pulp and pulp flow is understood to comprise an aqueous phase and a solid material phase, which includes fibres and other possible solids. The method according to the present invention may be used in pulping recycled paper, board and/or old corrugated containerboard (OCC), comprising starch, whereby the typical COD value of the aqueous phase of the untreated pulp flow is >20 kg/ton, more typically >35 kg/ton, sometimes even >50 kg/ton, before the addition of the coagulant agent and the flocculating agent. COD value is determined by disintegrating recycled fibre material to water, centrifuging thus obtained pulp and determining COD value from the separated aqueous phase by using Hach Lange method, according to description in the Experimental part of this application. Preferably the recycled fibre material is recycled board and/or old corrugated containerboard, preferably comprising at least 20 kg/ton starch, more preferably at least 30 kg/ton starch, starch being determined with iodine method which is described in Tappi standard T419 om-11 (Starch in paper), and using surface sizing starch as reference.

One possible advantage, which is provided by the present invention, is that the ash content of the produced paper increases, while the bursting strength of the paper is also increasing or remains at least on the same level. Typically, in the prior art, an increase in ash content decreases the bursting strength of the paper. As the trend is typically opposite, when the present invention is employed, it can be concluded that the present invention provides possibilities to increase the ash content and, at least relatively, the bursting strength, too. Typical increase in the bursting strength is 3-15%, more typically 5-10%, calculated in relation to the bursting strength of corresponding paper manufactured without sequential addition of coagulant agent and flocculating agent. The ash content increase may be 5-25%, more preferably 10-20%, typically 15-20%, calculated in relation to the ash content of corresponding paper manufactured without sequential addition of coagulant agent and flocculating agent.

In this application the terms "low molecular starch", "low molecular weight starch" and "starch having a low molecular weight" are interchangeable and they are used as synonyms to each other. The low molecular weight starch in the recycled pulp originates normally from surface sizing, and it is typically oxidised starch, acid degraded or enzyme degraded starch. The low molecular weight starch may be, for example, oxidized surface starch having a weight average in the range of 100 000-5 000 000 g/mol, more typically 200 000-4000 000 g/mol. Alternatively, the low molecular weight starch may be an acid degraded or enzyme degraded surface starch having a weight average in the range of 30 000-3 000 000 g/mol, more typically 40 000-2 000 000 g/mol. Typically pulp, which is obtained by pulping recycled fibre material, comprises low molecular starch from different sources. This means that the low molecular starch in process presently described may comprise oxidized surface starch as well as acid degraded and/or enzyme degraded surface starch.

Surface size starches may be specified based on the viscosity of the cooked starch, typical viscosity levels being between 15-400 mPas, more typically between 20-300 mPas at 70° C. at 10% concentration. Charge densities of enzyme degraded starches are very low, being quite near to zero at pH 7, e.g. between −0.05-0 meq/g absolute starch. Oxidized starches are typically more anionic compared to enzyme degraded starches, being about −0.3--0.01 meq/g, more typically about −0.2--0.02 meq/g calculated of absolute starch.

Advantageously the method according to the present invention may be used for paper, tissue or board production, where the fresh water consumption of the process is <10 m$^3$/ton produced paper or board, preferably <5 m$^3$/ton produced paper or board and/or the process water conductivity is at headbox >2500 µS/cm, preferably >3000 µS/cm, sometimes even >4000 µS/cm. In other words, the present method is especially suitable for pulping recycled fibre material in a process having a low fresh water consumption. Furthermore, the present invention is especially intended for retaining free low molecular weight starch in the aqueous phase of the pulp to the fibres, which originate from recycled paper, tissue and/or board.

The method according to the present invention is thus suitable for producing paper, tissue, board or the like from recycled fibre material.

A method according to one embodiment of the present invention for improving process of making paper, board or the like, the process employing recycled fibre material as raw material, comprises
  pulping recycled paper, board or the like in a pulper and obtaining pulp comprising at least recycled fibres and starch having low molecular weight dispersed in an aqueous phase,
  screening the pulp and separating unwanted material from the pulp,
  adding a coagulant agent to the pulp and allowing the coagulant agent to interact with starch having low molecular weight,
  adding a flocculating agent after the addition of the coagulant agent to a process flow and forming a starch comprising agglomerate,
whereby COD value of the aqueous phase of the pulp is reduced at least 10° A) from the COD value of the aqueous phase before the addition of the coagulant agent and the flocculating agent.

The coagulant agent interacts, either chemically or physically, with the low molecular weight starch, whereby a coagulation, coagulum or a loose agglomerate is formed. According to one embodiment of the invention the pulp flow is screened and unwanted material from the pulp flow is separated. The screened pulp flow is thickened to a higher concentration, e.g. storage concentration by separating a part of the aqueous phase from the pulp flow as a discharge flow, and the coagulant agent is added to the pulp flow before the thickening step of the screened pulp or to the discharge water flow from the thickening step. In case the coagulant agent is added to the pulp flow before the thickening of the pulp flow it is possible to add the coagulant agent either immediately after the pulping step, before the screening step or after the screening step. Addition of the coagulant agent to the pulp before the thickening step is advantageous as the enrichment of the starch to the water circulation is effectively prevented in the most processes, and a large amount of starch is effectively retained on the fibres.

According to one embodiment, especially when the process has effective screening and thickening steps, the coagulant agent may be added after the thickening step, for example after the storage towers. The coagulant agent may be added to the short circulation pulp between the stock proportioning and the headbox. Even in this embodiment the flocculating agent is added to the process after the coagulant agent, to a flow, which comprises interacted coagulant agent.

According to one embodiment of the invention the coagulant agent is an inorganic coagulant agent. The coagulant agent may be selected from aluminium compounds, iron compounds, bentonite or colloidal silica. Especially the coagulant agent is selected from the group comprising aluminium sulphate, aluminium chloride, polyaluminium chloride (PAC), polyaluminium sulphate (PAS), polyaluminium silica sulphate, sodium aluminate, alum, ferric sulphate ($Fe_2(SO_4)_3$), ferrous sulphate ($FeSO_4$), ferric ferrous sulphate, ferric chloride, ferrous chloride, ferric ferrous chloride, ferric chloride sulphate, ferric nitrate, ferric sulphate nitrate, ferric chloride nitrate, ferric hydroxide, bentonite, silicious material, such as colloidal silica, and any of their mixture. According to one embodiment the coagulant agent is selected from group consisting of bentonite, colloidal silica, aluminium compounds or iron compounds comprising Fe(III). Bentonite is here understood as montmorollonite clay mineral. Aluminium compounds and iron compounds comprising Fe(III) are preferred as coagulant agents.

The coagulant agent may be added in amount of
- 0.5-10 kg active aluminium/ton dry pulp, preferably 0.75-8 kg active aluminium/ton dry pulp, more preferably 1-5 kg active aluminium/ton dry pulp or
- 5-50 kg active Fe/ton dry pulp, preferably 6-40 kg active Fe/ton dry pulp, more preferably 8-20 kg active Fe/ton dry pulp or
- 0.5-10 kg dry bentonite/ton dry pulp, preferably 1-8 kg dry bentonite/ton dry pulp, more preferably 2-5 kg dry bentonite/ton dry pulp, or
- 0.1-1 kg dry silica/ton dry pulp, preferably 0.2-0.8 kg dry silica/ton dry pulp, preferably 0.25-0.5 kg dry silica/ton dry pulp, depending on the active substance in the coagulant agent.

Bentonite is typically used as 1-5 weight-% slurry, and it may have a particle size in the range of 200-800 nm. Colloidal silica is typically used as 0.5-25 weight-% slurry, and it may have a particle size in the range of 1-50 nm. Bentonite and colloidal silica slurries may be further diluted before use, if need be.

According to one embodiment the coagulant agent is polyaluminium chloride. Polyaluminium chloride is an inorganic polymer and it is typically present in a solution as a highly charged aluminium complex $Al_{13}O_4(OH)_{24}(H_2O)_{12}^{7+}$ or $AlO_4Al_{12}(OH)_{24}(H_2O)_{24}^{7+}$. In this application polyaluminium chloride is understood as polymerised aluminium substance, which may be presented also by the general formula $Al_2(OH)_xCl_{6-x}$, where $0<x<6$. The degree of neutralisation, i.e. the replacement of Cl ions with OH ions, may be expressed by using the unit basicity. The basicity of polyaluminium compound may be generally expressed by the following formula % Basicity=100×[OH]/3[Al]

The higher the basicity, the higher the degree of neutralisation. Depending on basicity of polyaluminum chloride fewer ions have a $3^+$ charge, and more ions are high charged, averaging $5^+$ to $7^+$.

According to one preferred embodiment of the present invention the coagulant agent is polyaluminium chloride having an aluminium content of 4-20%, preferably 7-18%, and a basicity 20-80%, preferably 30-70%, more preferably 35-55%. Typically polyaluminium chloride may be used as 20-40 weight-%, more typically as 30-40 weight-% aqueous solution. pH of the polyaluminium chloride solution is typically 0.5-4.2.

The interaction between low molecular weight starch and the coagulant agent may be chemical and/or physical. For example, polyaluminium chloride, alum and iron sulphates interact chemically with the low molecular weight starch and form coagulations, coagula or loose agglomerates. It is assumed that bentonite and colloidal silica adsorb or physically bind the starch, whereby loose agglomerates are formed. In case the coagulant agent is a metal coagulant with high cationicity, such as polyaluminium chloride or polyaluminium sulphate, it may form an inorganic polymer, which attracts and interacts with low molecular weight starch, fines and possible filler particles. The size of the formed coagulation, coagulum or loose agglomerate is then further increased when it comes into contact with the flocculating agent.

Flocculating agent is added after the addition of the coagulant agent so that the flocculating agent comes into a contact with the coagulant agent or the coagulant, coagulum or loose agglomerate which is formed, when low molecular weight starch is bound or attached to coagulant agent or absorbed on the coagulant agent. In other words, the flocculating agent is added to a flow, which comprises interacted coagulant agent, e.g. pulp flow, preferably after pulp storage towers or silos and before the headbox of the paper, tissue or board machine. Thus flocculating agent is preferably added to the short circulation of a paper, tissue or board machine, however after the addition of the coagulant agent to a flow comprising interacted coagulant agent. Flocculating agent may be added at one feeding location or at several separate feeding locations. Flocculating agent may be added directly to the pulp flow, or it may be added first to an aqueous process flow, which is later combined with the pulp flow. It is possible to add flocculating agent both to the pulp flow and to one or several aqueous process flows. The flocculating agent(s) is typically added as aqueous dispersion in amount of 20-2000 g/ton paper or board, typically 50-1000 g/ton paper or board, preferably 100-500 g/ton paper or board, the values being given as amount of active flocculating agent(s).

According to one preferred embodiment several different flocculating agents may be added, such as two, three or four different flocculating agents, preferably at several separate feeding locations. If several flocculating agents are added, advantageously at least one of them is anionic. For example, anionic polyacrylamide may be added after the addition of cationic polyacrylamide. In any case, the first flocculating agent is preferably added to a flow comprising interacted coagulant agent.

Typically the flocculating agent is added after the coagulant agent to a flow comprising interacted coagulant agent, the reaction time for the interaction between the coagulant agent and low molecular starch being >1 min, preferably in the range of 2-30 min, more preferably in the range of 5-15 min. This means that the flocculating agent is added after the required reaction time has elapsed. For example, when polyaluminium chloride is used as the coagulant agent, it is added to the pulp flow or to a water flow comprising low molecular weight starch, and a typical reaction time for the interaction between polyaluminium chloride and low molecular weight starch, preceding the flocculating agent addition, is in the range of 7-12 min, more typically ca. 10 min.

According to one embodiment of the invention the flocculating agent is selected from the group comprising cationic polyacrylamide (C-PAM), anionic polyacrylamide (A-PAM), polyvinyl amine (PVAm), polyethylene oxide (PEO), polyethyleneimine (PEI) and their mixtures. According to one embodiment of the invention the flocculating agent is cationic polyacrylamide (C-PAM) and/or anionic polyacrylamide (A-PAM) and it has an average molecular weight (MW) in the range of 4 000 000-22 000000 g/mol, more preferably 6 000 000-20 000 000 g/mol, still more preferably 7 000 000-18 000 000 g/mol. According to one advantageous embodiment the flocculating agent is a polymer having an average molecular weight (MW) >8 000 000 g/mol, preferably 9 000 000-18 000 000 g/mol. In this application the value "average molecular weight" is used to describe the magnitude of the polymer chain length. Average molecular weight values are calculated from intrinsic viscosity results measured in a known manner in 1N NaCl at 25° C. by using an Ubbelohde capillary viscometer. The capillary selected is appropriate, and in the measurements of this application an Ubbelohde capillary viscometer with constant K=0.005228 was used. The average molecular weight is then calculated from intrinsic viscosity result in a known manner using Mark-Houwink equation $[\eta]=K \cdot M^a$, where $[\eta]$ is intrinsic viscosity, M molecular weight (g/mol), and K and a are parameters given in Polymer Handbook, Fourth Edition, Volume 2, Editors: J. Brandrup, E. H. Immergut and E. A. Grulke, John Wiley & Sons, Inc., USA, 1999, p. VII/11 for poly(acrylamide-co-N,N,N-trimethyl aminoethyl chloride acrylate), 70% acrylamide. Accordingly, value of parameter K is 0.0105 ml/g and value of parameter a is 0.3. The average molecular weight range given for the parameters in used conditions is 450 000-2 700 000 g/mol, but the same parameters are used to describe the magnitude of molecular weight also outside this range. For polymers having a low average molecular weight, typically around 1 000 000 g/l or less, the average molecular weight may be measured by using HPLC size exclusion chromatography, using PEO for calibration. HPLC size exclusion chromatography is used especially if no meaningful results can be obtained by using intrinsic viscosity measurement.

Preferably, after the addition of the coagulant agent and the flocculating agent, in this order, and obtaining a starch comprising agglomerate, the agglomerate is retained on the recycled fibres in pulp or to the web which is formed.

It is also possible to add biocide and/or amylase enzyme inhibitor for microbe control in the process. Biocide and/or amylase enzyme inhibitor may be added to the pulper and/or to a flow in the process, such as the pulp flow or the aqueous process flow. Preferably biocide and/or amylase enzyme inhibitor is added to the process flow and/or pulp flow before the pulp storage towers or silos located after the pulp thickening step. Biocide/enzyme inhibitor may be added to the pulp in the pulper or before thickening of the screened pulp. According to one preferred embodiment of the present invention biocide and/or amylase enzyme inhibitor is added to the pulp flow within 2 hours from the moment when the pulp flow exits the pulper outlet. Further, the biocide or the amylase enzyme inhibitor may be added to the pulp between inlet of the pulper and thickening step of the screened pulp. Early addition of biocide or amylase enzyme inhibitor is preferred, as it minimises further degradation of low molecular starch, and may improve the coagulation and flocculation of the low molecular starch, and thereby retention of the starch to the recycled fibres. It is possible to add biocide and/or amylase enzyme inhibitor only at one biocide feeding location. Alternatively, biocide and/or amylase enzyme inhibitor may be added at several separate biocide feeding locations, spaced apart from each other, whereby the addition of biocide/enzyme may be targeted at known problem points of the process. It is also possible to add biocide at first biocide feeding location(s) and amylase enzyme inhibitor at different and separate second biocide feeding location(s).

Preferably the biocide and/or amylase enzyme are added as early as possible in order to minimise the further degradation of low molecular starch. Biocide and/or amylase enzyme may be added, for example, to the aqueous dilution flow, which is led to the pulper. For example, biocide and/or amylase enzyme may be added to storage tank of dilution water of the pulper.

The biocide may be any suitable biocide, which reduces the number of viable bacteria and/or microbes in the process at least 80%. Similarly the amylase enzyme inhibitor may be any substance that inhibits the formation of or deactivates the amylase enzyme, such as a zinc inhibitor. Preferably the amylase enzyme inhibitor may be any suitable inhibitor reducing amylase enzyme activity under process conditions at least 20%.

According to one embodiment of the invention the biocide may be selected from a group comprising oxidizing biocides, such as sodium hypochlorite, hypobromous acid, chlorine dioxide; halogenated hydantoins, such as bromochloro-dimethylhydantoin; partially halogenated hydantoins such as monochloro-dimethylhydantoin; haloamines, such as chloramines or bromamines; and their mixtures. A haloamine, which is suitable for use in one embodiment of the present invention, may be formed by combining an ammonium source, such as ammonium sulfate, ammonium chloride, ammonium bromide, ammonium phosphate, ammonium nitrate or any other ammonium salt, including urea, with an oxidant such as sodium hypochlorite. Biocide may be added continuously to provide a total active chlorine concentration of from about 0.1-5 ppm throughout the treated portions of the process. More preferably, the active chlorine concentration in these portions of the process is about 0.75-2 ppm. It is also possible to add biocide by using slug dosing, which refers to periodical, or batch, dosing of biocide into the process, as contrasted with a continuous dosing. Typically a slug dose is 1-10 ppm, preferably 3-7 ppm. The slugs would preferably be fed for about 3-30 minutes each about 6-24 times a day, and are more preferably fed for about 5-15 minutes each about 12-24 times a day.

Strengthening agents and/or flocculant additives may be added to the pulp flow. According to one embodiment of the invention the strengthening agent is selected from the group comprising starch, cationic polyacrylamide (C-PAM), anionic polyacrylamide (A-PAM), glyoxalated polyacrylamide (G-PAM), amphoteric polyacrylamide, polydiallyldimethylammonium chloride (poly-DADMAC), polyacrylic amide (PAAE), polyvinyl amine (PVAm), polyethylene oxide (PEO), polyethyleneimine (PEI), chitosan, guar gum, carboxymethyl cellulose (CMC) and their mixtures. Starch may be cationic, anionic or amphoteric. Starch may be non-degraded or high cationic degraded starch having DS>0.05, non-degraded starch being preferred. When the strengthening agent is a synthetic polymer it may have an average molecular weight in the range 100 000-20 000 000 g/mol, typically 300 000-8 000 000 g/mol, more typically 300 000-1 500 000 g/mol, provided that the molecular weight of the strengthening agent is lower than the molecular weight of the corresponding flocculating agent. The average molecular weights are measured by using an Ubbelohde capillary viscometer, as described above in this application.

Strengthening agent is typically added as aqueous dispersion in amount of 0.1-20 kg/ton paper or board, typically 0.3-5 kg/ton paper or board, preferably 0.5-3 kg/ton paper or board, given as amount of active substance. The addition of a strengthening agent may preferably be performed before the addition of the flocculating agent, and the addition of strengthening agent is preferably performed to the pulp flow, preferably to the thick stock flow, the thick stock consistency being 2-6 weight-%.

It is also possible to use a flocculant additive which is selected from the group comprising bentonite, colloidal silica and conventional papermaking fixatives, such as polydiallyldimethylammonium chloride (poly-DADMAC) or polyamines.

Flocculant additive is typically added to the process before or after the addition of the flocculating agent, but after the addition of the coagulant agent. Flocculant additive, especially fixative, which may be used as a flocculant additive, is added to the pulp flow, typically in amount of 50-4 000 g/ton paper or board, typically 100-2000 g/ton paper or board, preferably 200-800 g/ton paper or board, given as amount of active substance.

According to one embodiment of the invention the coagulant agent is added to the discharge water flow of the thickening step, i.e. to the discharge water flow of a thickener, at one feeding location or more feeding locations. In this embodiment, the discharge water flow from the thickening step may be led forward in the process and used as dilution water between the machine chest and the headbox. Coagulant agent is introduced to the discharge water flow comprising starch having a low molecular weight after the thickening step, but before the machine chest. Coagulant agent may be fed at one feeding location or simultaneously at two, three or more feeding locations. Starch interacts with the coagulant agent and forms loose coagulants, coagula or agglomerates. Flocculating agent is added to the pulp flow and/or to the discharge water flow at flocculation feeding locations after the addition of the coagulant agent. For example, it is possible to add also the flocculating agent to the discharge flow from the thickening step. However, flocculating agent is added after the addition of the coagulating agent at at least one of the coagulant feeding locations, but before the machine chest in order to guarantee the retention of the recycled starch to the fibres and/or to the web(s) to be formed.

BRIEF DESCRIPTION OF THE SEVERAL VIEWS OF THE DRAWINGS

The invention is described in more detail below with reference to the enclosed schematic drawings, in which.

DETAILED DESCRIPTION

Figure 1:
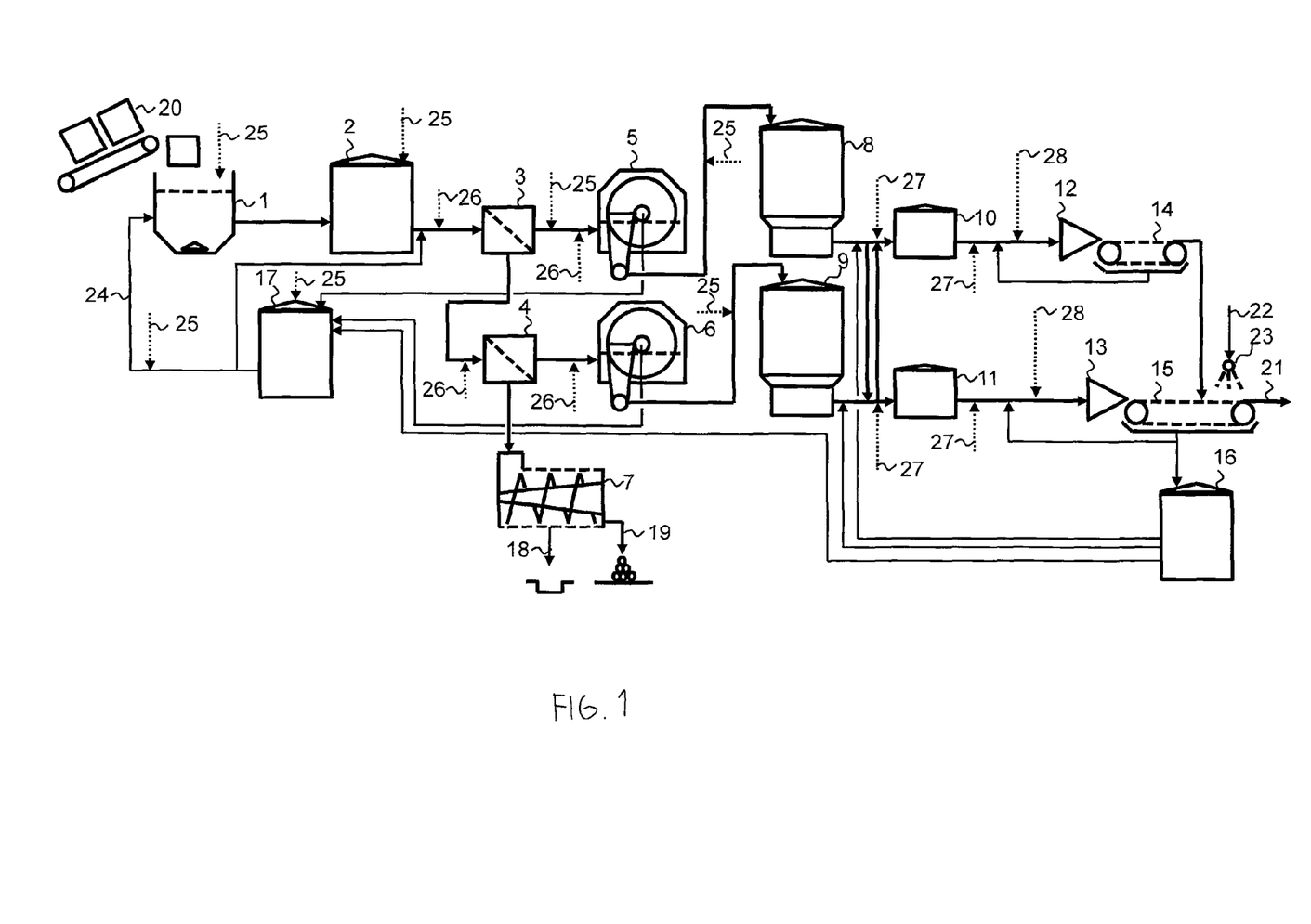
FIG. 1 shows a first embodiment of the present invention for manufacturing recycled board.

In FIG. 1 is shown a first embodiment of the present invention for manufacturing recycled board. Recycled paper and/or board bales 20 are introduced to a pulper 1 through an inlet. In the pulper 1 the paper and/or board bales are disintegrated and a flow of pulp comprising recycled fibres and starch having a low molecular weight is led out of the pulper 1 to a pulper dump chest 2. From pulper dump chest the pulp is led to fractionation screening 3 and further either to fine screening 4 or short fibre thickener 5. From the fine screening 4 fibres are led to the long fibre thickener 6 and reject from the screening stage is led to the reject thickening 7. At the reject thickening 7 particulate material and the like is separated from water, and led out of process as sludge reject 19. Water is removed as effluent 18 to an effluent treatment (not shown). In conventional processes starch having low molecular weight has exited the process through these material flows, and burdened effluent 18 or sludge reject 19.

Coagulant agent can be introduced to the pulp comprising recycled fibres and starch having a low molecular weight at plurality of alternative coagulant feeding locations 26. It is possible to feed coagulant agent at one feeding location 26 or to feed coagulant at two or more feeding locations 26 simultaneously. Coagulant feeding locations 26 are situated, at the latest, before the short fibre thickener 5 and/or the long fibre thickener 6. From these thickeners 5, 6 separated water is led to white water storage 17 and further back to pulper 1 as pulper water 24. Coagulant feeding locations 26 are situated so that the coagulant agent interacts with starch before the thickeners 5, 6. Thus starch is at least mainly progressing forward with the fibre phase in the process and not recirculated back to white whiter storage 17 or pulper 1 with the water phase.

From the short fibre thickener 5 short fibre pulp is led to short fibre storage tower 8 and correspondingly, long fibre pulp is led from the long fibre thickener 6 to long fibre storage tower 9. From fibre storage towers 8, 9 pulps are led to top ply machine chest 10 or back ply machine chest 11 and further to top ply headbox 12 or back ply headbox 13. Paper or board webs for top ply or back ply are formed on top ply wire 14 or back ply wire 15 and reunited after their initial formation. Water which is removed from the web is either directly circulated back to the process or collected to a white water chest 16. Finally, formed paper or board web 21 is transferred further to pressing and drying. Fresh water 22 is added to the process through shower pipes 23.

Flocculating agent is added to the pulp at flocculation feeding locations 28. The flocculating agent may be added only to the short fibre pulp from the short fibre storage tower 8 or only to the long fibre pulp from the long fibre storage tower 9, or preferably both to the short fibre pulp from the short fibre storage tower 8 and to the long fibre pulp from the long fibre storage tower 9. Flocculating agent is added after the addition of the coagulating agent at one of the coagulant feeding locations 26, but before the headbox 12, 13 in order to guarantee the retention of the recycled starch to the fibres and/or to the web(s) to be formed.

Biocide or amylase enzyme inhibitor is preferably added to the process at one or several of the biocide feeding locations 25 for microbe control. It is possible to add biocide only at one biocide feeding location or to add separate dosages of biocide/enzyme inhibitor at several feeding locations. It is also possible to add biocide at one feeding location and amylase enzyme inhibitor at different feeding location.

In one embodiment, it is also possible to add strengthening agent and/or flocculation additive to the process at additive feeding locations 27. Typically strengthening agent and/or flocculation additive are added after the storage towers 8, 9 but at the latest just before headbox 12, 13. Preferably strengthening agents and/or flocculation additives are added after the addition of the coagulating agent, but before the addition of the flocculating agent.

Figure 2:
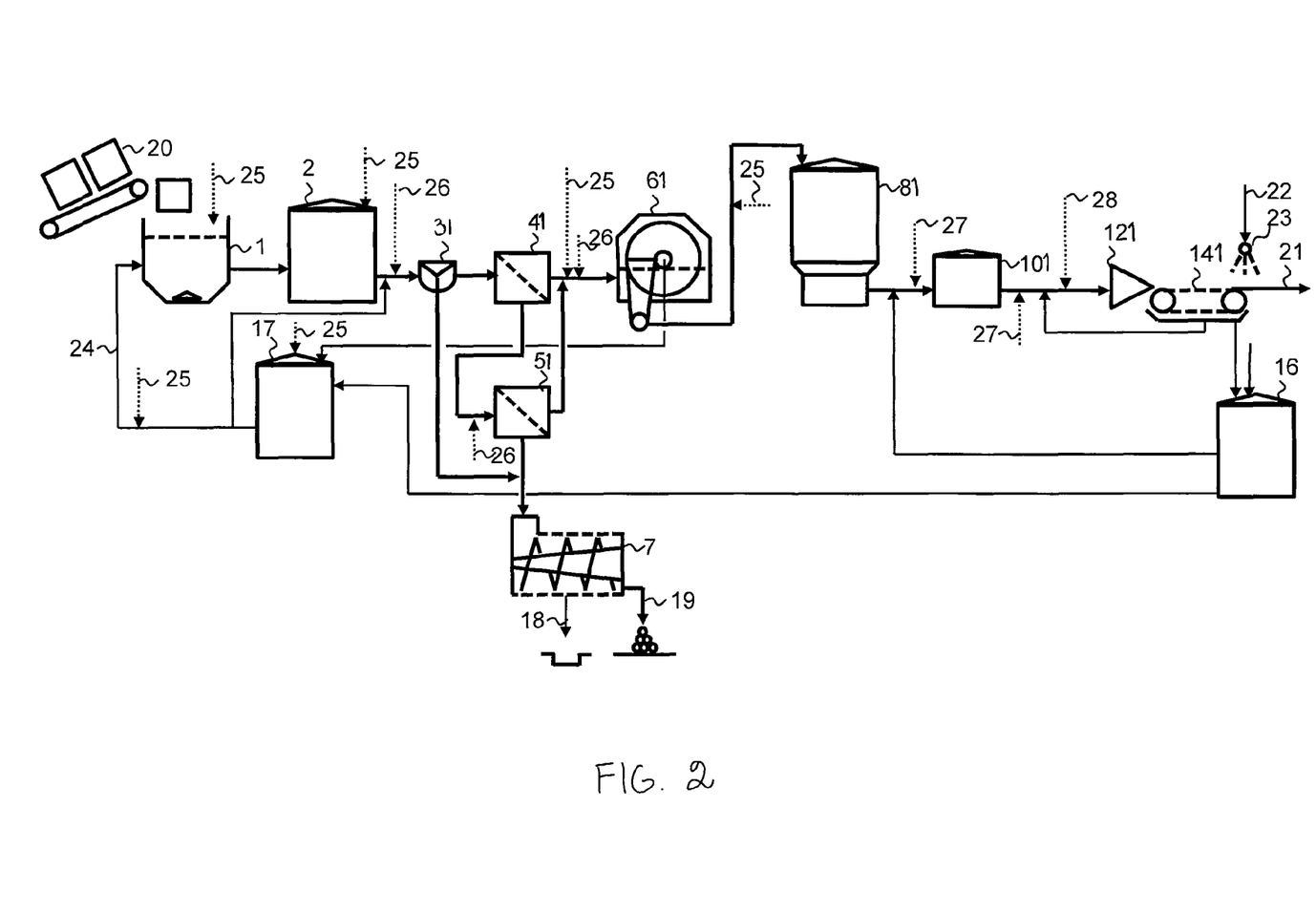
FIG. 2 shows a second embodiment of the present invention for manufacturing recycled paper, tissue or board.

In FIG. 2 is shown a second embodiment of the present invention for manufacturing recycled paper, tissue or board. Recycled paper and/or board bales 20 are introduced to a pulper 1 through a pulper inlet. In the pulper 1 the paper and/or board bales are disintegrated and a pulp flow comprising recycled fibres and starch having a low molecular weight is led out of the pulper 1 to a pulper dump chest 2. From pulper dump chest 2 the pulp is led to a flotation unit 31 (optional) and further to fine screening primary stage 41. From the fine screening primary stage 41 fibres are led either to a thickener 61 or to a fine screening reject stage 51. From fine screening reject stage 51 fibres are led to the thickener 61 and the reject is led to the reject thickening 7. At the reject thickening 7 particulate material and the like is separated from water, and led out of process as sludge reject 19. Water is removed as effluent 18 to an effluent treatment (not shown). In conventional processes starch having low molecular weight has exited the process through these material flows, and burdened effluent 18 or sludge reject 19.

Coagulant agent may be introduced to the pulp comprising recycled fibres and starch having a low molecular weight at plurality of alternative coagulant feeding locations 26. It is possible to feed coagulant agent at one feeding location 26 or to feed coagulant at two or more feeding locations 26 simultaneously. Coagulant feeding locations 26 are situated, at the latest, before the thickener 61, from which separated water is led to white water storage 17 and further back to pulper 1 as pulper water 24. Coagulant feeding locations 26 are situated so that the coagulant agent interacts with starch before the thickener 61. Thus starch is at least mainly progressing forward with the fibre phase in the process and not recirculated back to white whiter storage 17 or pulper 1 with the water phase.

From the thickener 61 pulp is led to a fibre storage tower 81. From the fibre storage tower 81 pulp is led to a machine chest 101 and further to a headbox 121. Paper, tissue or board web is formed on a wire 141. Water which is removed from the formed web is either directly circulated back to the process or collected to a white water chest 16. Finally, formed paper, tissue or board web 21 is transferred further to pressing and drying. Fresh water 22 is added to the process through shower pipes 23.

Flocculating agent is added to the pulp at flocculation feeding location 28. Flocculating agent is added after the addition of the coagulating agent at one of the coagulant feeding locations 26, but at the latest just before the headbox 121 in order to guarantee the retention of the recycled starch to the fibres and/or to the web to be formed.

Biocide or amylase enzyme inhibitor is preferably added to the process at one or several of the biocide feeding locations 25. It is possible to add biocide only at one biocide feeding location or to add separate dosages of biocide/enzyme inhibitor at several feeding locations. It is also possible to add biocide at one feeding location and amylase enzyme inhibitor at different feeding location.

In one embodiment, it is also possible to add strengthening agent and/or flocculation additive to the process at additive feeding locations 27. Typically strengthening agent and/or flocculation additive are added after the fibre storage tower 81 but before headbox 121. Preferably strengthening agents and/or flocculation additives are added after the addition of the coagulating agent, but before the addition of the flocculating agent.

Figure 3:
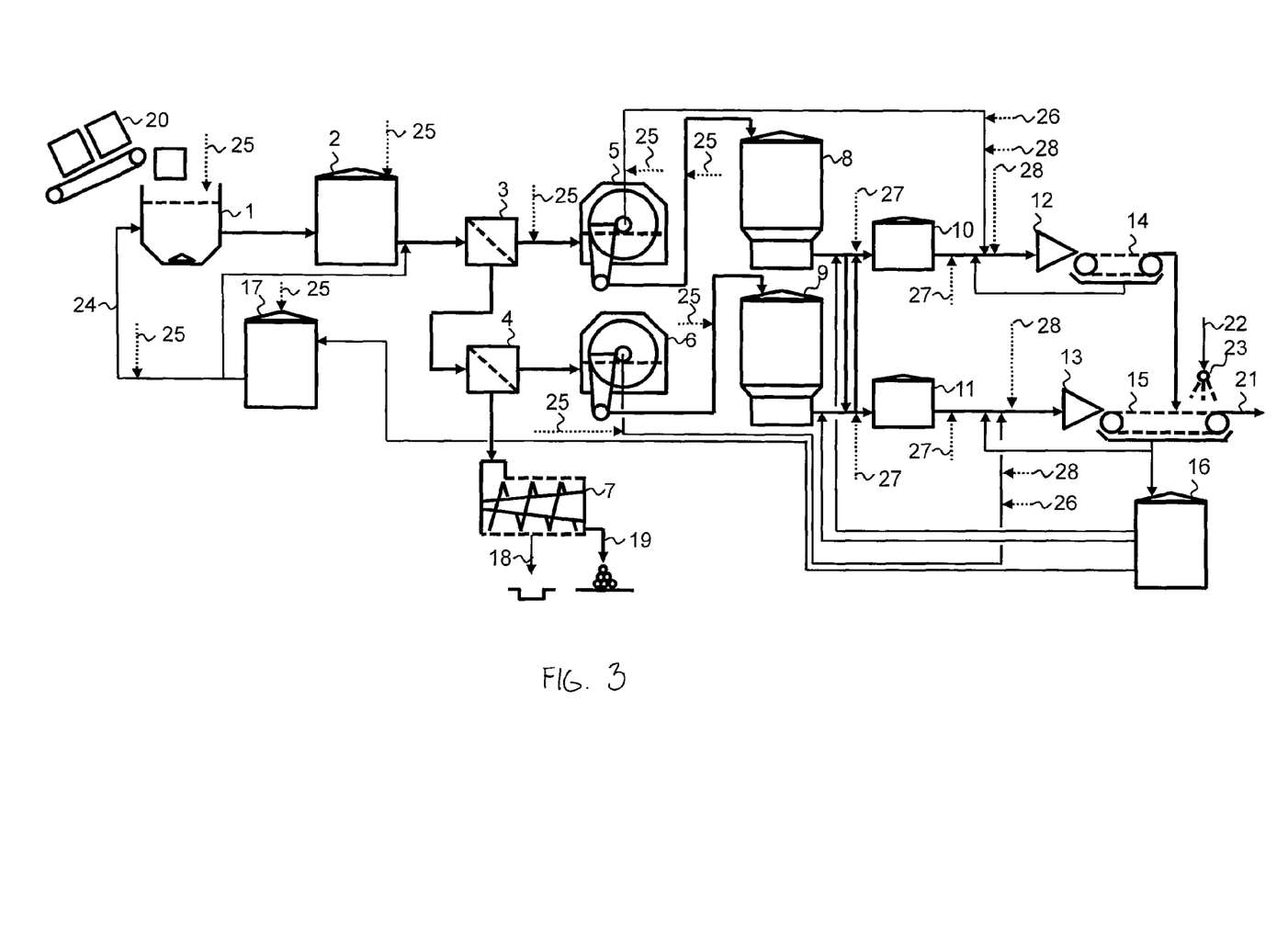
FIG. 3 shows still another embodiment of the invention for manufacturing recycled board.

FIG. 3 shows still another embodiment of the invention for manufacturing recycled board. Recycled paper and/or board bales 20 are introduced to a pulper 1 through a pulper inlet. In the pulper 1 the paper and/or board bales are disintegrated and a flow of pulp comprising recycled fibres and starch having a low molecular weight is led out of the pulper 1 to a pulper dump chest 2. From pulper dump chest 2 the pulp is led to fractionation screening 3 and further either to fine screening 4 or short fibre thickener 5. From the fine screening 4 fibres are led to the long fibre thickener 6 and reject from the screening stage is led to the reject thickening 7. At the reject thickening 7 particulate material and the like is separated from water, and led out of process as sludge reject 19. Water is removed as effluent 18 to an effluent treatment (not shown).

Discharge water from the thickeners 5, 6 is led forward in the process and used as dilution water between the machine chest 10, 11 and headbox 12, 13. Coagulant agent is introduced to the discharge flow from the short fibre thickener or to the discharge flow of the long fibre thickener at coagulant feeding locations 26. The discharge flow comprises starch having a low molecular weight and this starch interacts with the coagulant agent and forms loose coagulants or agglomerates. It is possible to feed coagulant agent at one feeding location 26 or to feed coagulant at two or more feeding locations 26 simultaneously. Coagulant feeding locations 26 are situated after the short fibre thickener 5 and/or the long fibre thickener 6, but before the headbox 12, 13.

From the short fibre thickener 5 short fibre pulp is led to short fibre storage tower 8 and correspondingly, long fibre pulp is led from the long fibre thickener 6 to long fibre storage tower 9. From fibre storage towers 8, 9 pulps are led to top ply machine chest 10 or back ply machine chest 11 and further to top ply headbox 12 or back ply headbox 13. Paper or board webs for top ply or back ply are formed on top ply wire 14 or back ply wire 15 and reunited after their initial formation. Water which is removed from the web is either directly circulated back to the process or collected to a white water chest 16. Finally, formed paper, tissue or board web 21 is transferred further to pressing and drying. Fresh water 22 is added to the process through shower pipes 23.

Flocculating agent is added to the pulp and/or to the discharge flows at flocculation feeding locations 28. The flocculating agent may be added only to the short fibre pulp from the short fibre storage tower 8 or only to the long fibre pulp from the long fibre storage tower 9, or preferably both to the short fibre pulp from the short fibre storage tower 8 and to the long fibre pulp from the long fibre storage tower 9. It is also possible to add flocculating agent to discharge flow from the short fibre thickener 5 and/or to the discharge flow of the long fibre thickener 6. Flocculating agent is added after the addition of the coagulating agent at one of the coagulant feeding locations 26, but before the headbox 12, 13 in order to guarantee the retention of the recycled starch to the fibres and/or to the web(s) to be formed.

Biocide or amylase enzyme inhibitor is preferably added to the process at one or several of the biocide feeding locations 25 for microbe control. It is possible to add biocide only at one biocide feeding location or to add separate dosages of biocide/enzyme inhibitor at several feeding locations. It is also possible to add biocide at one feeding location and amylase enzyme inhibitor at different feeding location.

In one embodiment, it is also possible to add strengthening agent and/or flocculation additive to the pulp at additive feeding locations 27 . . . Typically strengthening agent and/or flocculation additive are added to the pulp after the storage towers 8, 9 but at the latest just before machine chest 12, 13.

Strengthening agents and/or flocculation additives may be added to the pulp before the addition of the coagulating agent and the flocculating agent.

EXPERIMENTAL

The some embodiments of the invention are further described in the following non-limiting examples.

Example 1

Test slurry is prepared by using bleached pine kraft pulp refined in a Valley Hollander to Schopper Riegler value of 25 and degraded starch (Perfectamyl A 4692, Avebe), which is oxidized, low-viscosity, weakly anionic potato starch. Measured starch content in the test slurry is 301 mg/l. Test slurry is diluted to 5 g/l consistency and adjusted to room temperature+23° C.

Used test chemicals are diluted to suitable concentration before addition to the test slurry. The dilution level is selected such that the dosage of a diluted test chemical is between 1-3 ml. They are added to the test slurry as shown in Table 1 and a dynamic drainage jar, DDJ (Paper Research Materials, Inc., Seattle, Wash.) is used to control the retention degree of starch to paper and how much starch remains in the filtrate.

Used test chemicals are:

Prod A: coagulant agent, polyaluminium silicate product, Al-content 7.8 weight-%, basicity 40%.

Prod B: strengthening agent, glyoxylated PAM product, co-polymer of acrylamide and diallyldimethylammonium chloride, which is treated with glyoxal, charge density 0.5 meq/g dry polymer product, MW average 200 000 g/mol, dry solids 7.5%.

Prod C: flocculating agent, anionic polyacrylamide strength resin product, aqueous solution of co-polymer of acrylamide and acrylic acid, charge density: −2.9 meq/g dry polymer product, MW average 400 000 g/mol, dry solids 20%, viscosity 6000 mPas at 25° C. measured with Brookfield DVI+, equipped with small sample adapter, and spindle 31.

Prod D: flocculating agent, cationic polyacrylamide product, co-polymer of acrylamide and acryloyloxyethyltrimethylammonium chloride, charge density 1.0 meq/g dry polymer product, MW average 7 000 000 g/mol, dry solids 90%.

Prod E: coagulant agent, colloidal silica product, 15% solids content, particle size 5 nm, S-value 60.

The pulp slurry volume in DDJ is 500 ml, stirrer speed is 1000 rpm and wire type is M60. Test chemical addition times are indicated as negative time before the drainage starts in Table 1. Stirring is started 45 s before drainage and is continuing after drainage until sample volume is filtered. The sample is taken from the first 100 ml filtrate. Filtrate is centrifuged with speed 3000 rpm 4-5 hours after starch addition.

From the centrifuge supernatant COD is measured by using Hach Lange method LCK 1041 according to manufacturer's instructions. 2 ml supernatant is carefully pipetted to a sample cuvette, which is closed and thoroughly cleaned outside, and inverted. Sample cuvette is heated in a thermostat 15 min at 175° C. The hot sample cuvette is allowed to cool to temperature 80° C. in the thermostat, whereafter it is removed from the thermostat, carefully inverted twice, and allowed to cool to room temperature outside the thermostat. The outside of the sample cuvette is cleaned and the evaluation is carried out. According to the test method oxidizable substances react with sulphuric acid-potassium dichromate solution in the presence of silver sulphate as a catalyst. Chloride is masked by mercury sulphate. The green colouration of $Cr^{3+}$ is evaluated, it being indicator of the COD value of the sample. The evaluation being performed by using a spectrometer.

Starch is measured from the filtrate by using Hach Lange method LCK 357 according to manufacturer's instructions. 2.0 ml sample is pipetted into an open cuvette, Cuvette is closed and mixed, evaluated after 10 minutes. pH of the sample should be in the range of 4-7, temperature 22° C. The analysed sample should be colourless and free of turbidities. Slight colouration may be allowed for with the help of a sample specific blank value, prepared by using 0.4 ml distilled water and 2 ml sample. Turbidities may be eliminated by passing the sample through a membrane filter (LCW 904). The sample evaluation is performed by spectrophotometric measurement at 535 nm, factor 127, using photometer RD Lange, LASA 100 v. 1.20. Calibration curve for the measurement is prepared by using Cargill C*film TCF07312 starch, which is cooked at 94-98° C., ca. 30 min.

The results of Example 1 are shown in Table 1. From Table 1 it can be seen that the addition of coagulant agent and flocculating agent, in this order, clearly improve the starch retention, i.e. the amount of starch in the filtrate is decreased. Similarly the COD value of the filtrate is decreased. This indicates that the starch would be retained to the fibres at the thickening step or at the wire section of the paper machine.

TABLE 1

Retention test for starch with dynamic drainage jar (DDJ).

| | Test time, s | | | | | Filtrate | |
| | −40 | −30 | −25 | −15 | −10 | | |
| | Amounts of used test chemicals | | | | | Results | |
| Test No | Prod A, kg/t prod.* | Prod B, kg/t prod.* | Prod C, kg/t prod.* | Prod D, kg/t prod.* | Prod E, kg/t prod.* | COD mg/l | Starch mg/l |
|---|---|---|---|---|---|---|---|
| 1 | 0 | 0 | 0 | 0 | 0 | 543 | 301 |
| 2 | 0 | 0 | 0 | 0.3 | 0 | 401 | 272 |
| 3 | 0 | 30 | 2 | 0.3 | 3 | 398 | 293 |
| 4 | 25.6 | 30 | 2 | 0.3 | 3 | 227 | 189 |
| 5 | 64.1 | 0 | 0 | 0.3 | 3 | 202 | 212 |

*dosage of product, not calculated as active substance

Example 2

Test slurry is prepared from liner board containing surface size starch. Dry board is cut into 2×2 cm pieces and a batch of disintegrated pulp is prepared by adding 30 g of cut board pieces into 1.5 liters tap water, temperature+45° C. After 5 min soaking, the board pieces are disintegrated in a britt jar (Paper Research Materials, Inc., Seattle, Wash.) for 50 000 rotations.

The obtained pulp slurry is diluted to reach consistency 0.5%. Total diluted pulp volume is 20 liters. 0.5 liters OCC-pulp with high bacterial number and amylase activity is used as dilution water, the rest of the dilution water being fresh water. Starch has been added in amount of 3 g/l to the OCC pulp, and in addition to the natural bacterial flora of the process water, two known amylase positive bacteria originating from paper machines, *Deinococcus geothermalis* Hambi 2411 and *Meiothermus silvanus* Hambi 2478, has been inoculated into the water. The water has been incubated at +45° C., under shaking 120 rpm, for 3 d.

Two 1 liter portions are removed as reference samples and the rest of the slurry is treated with monochloramine as biocide so that the measurable residual total chlorine is approximately 1.5 mg/l. In addition, 100 mg/l zinc, originating from zinc chloride, is added to the pulp slurry for microbe control. Temperature of the pulp slurry is adjusted to room temperature, +23° C.

Retention test is done 2-4 hours after biocide addition. Used test chemicals are added as shown in Table 2 to a dynamic drainage jar, DDJ (Paper Research Materials, Inc., Seattle, Wash.), to control the retention degree of starch to paper and how much starch remains in the filtrate. The volume of pulp slurry in DDJ is 500 ml, stirrer speed is 1000 rpm and wire type M60.

Used test chemicals are:

MCA: Biocide, monochloramine.

Prod F: coagulant agent, aluminium sulphate, Al-content 9%, dry powder.

Prod G: coagulant agent, bentonite, alkali activated, fine milled, dry solids 88%, dispersed to 3% slurry.

Prod H: coagulant agent, polyaluminium chloride, Al-content 9.3%, basicity: 43%.

Prod E: coagulant agent, colloidal silica.

Prod D: flocculating agent, cationic polyacrylamide product, co-polymer of acrylamide and acryloyloxyethyltrimethylammonium chloride, charge density 1.0 meq/g dry polymer product, MW average 7 000 000 g/mol, dry solids 90%.

Prod J: flocculating agent, anionic polyacrylamide product, co-polymer of acrylamide and acrylic acid, charge density −2.7 meq/g dry polymer product, MW average 15 000 000 g/mol, dry solids: 90%.

Prod C: flocculating agent, anionic polyacrylamide strength resin product, aqueous solution of co-polymer of acrylamide and acrylic acid, charge density −2.9 meq/g dry polymer product, MW average 400 000 g/mol, dry solids 20%, viscosity 6000 mPas at 25° C. measured with Brookfield DVI+, equipped with small sample adapter, and spindle 31.

Prod K: flocculating agent, cationic polyacrylamide micropolymer aqueous dispersion product, active polymer content 22%, charge density 1.1 meq/g dry active polymer product, MW average of the polymer 5 000 000 g/mol.

Chemical addition times are indicated in Table 2 as negative time before the drainage starts. The sample is taken from the first 100 ml filtrate. Filtrate is centrifuged with 3000 rpm 4-5 hours after biocide addition. From the centrifuge supernatant COD is measured by using Hach Lange method LCK 1041 according to manufacturer's instructions, as described above. Starch is measured from the filtrate by using Hach Lange method LCK 357 according to manufacturer's instructions, as described above. The results are shown in Table 2.

From Table 2 it can be observed that the addition of coagulant agent and flocculating agent, in this order, clearly improve the starch retention, i.e. the amount of starch in the filtrate is decreased. Similarly the COD value of the filtrate is decreased. This indicates that the starch would be retained to the fibres at the thickening step or at the wire section of the paper machine.

tegration is made in britt jar (Paper Research Materials, Inc., Seattle, Wash.) 50 000 rotations, 20 hours before the sheet preparation.

Monochloramine (MCA) and Zn is added to the dilution water of some of the samples. Zn is dosed as zinc chloride solution, dosage being 50 ppm. The MCA dosage is also 50 ppm, high enough to have residual chloride in the pulp slurry on following day. Test pulp slurry properties are shown in Table 3.

TABLE 3

Properties of test pulp slurry.

| Property | Value | Measurement Device |
|---|---|---|
| pH | 7.8 | Knick Portamess Type 911pH |
| Turbidity (NTU) | 660 | WTW Turb 555IR |
| Conductivity (mS/cm) | 2.3 | Knick Portamess Cond Type 911 |
| Cationic demand (µekv/l) | 59 | PCD 03 (Mütek) |
| Zeta-potential (mV) | −8.4 | SZP 06 (Mütek Analytic GmbH) |
| Consistency (g/l) | 20 | |

Test pulp slurry is further diluted with conductivity adjusted tap water to 1% concentration 1-2 hours before the sheet preparation. Conductivity of tap water is adjusted to same level than in tray water by adding NaCl.

General principle of producing hand sheets with Rapid Kö then hand sheet former is as follows:

Sheets are formed with Rapid Kö then sheet former according to standard ISO 5269/2. The pulp suspension is stirred at

TABLE 2

Results of Example 2

| | | | | | time, s | | | | | |
| | | −345 Proc F | −45 | −35 | −20 | −15 | −15 | −10 | −5 | Filtrate |
| Test No. | microbe control | kg/t prod.* | Prod G kg/t abs.** | Prod H kg/t, prod.* | Prod E kg/t, prod.* | Prod D kg/t prod.* | Prod J kg/t prod.* | Prod C kg/t prod.* | Prod K kg/t prod.* | COD mg/l | Starch mg/l |
|---|---|---|---|---|---|---|---|---|---|---|---|
| 1 | MCA + Zn | | | | | | | | | 334 | 221 |
| 2 | MCA + Zn | | | 0 | | 0.3 | | | | 309 | 205 |
| 3 | MCA + Zn | | | 5 | | 0.3 | | | | 287 | 188 |
| 4 | MCA + Zn | | | 10 | | 0.3 | | | | 284 | 179 |
| 5 | MCA + Zn | | | 5 | | | 0.3 | | | 295 | 196 |
| 6 | MCA + Zn | | | 10 | | | 0.3 | | | 285 | 188 |
| 7 | MCA + Zn | | | 20 | | | 0.3 | | | 282 | 166 |
| 8 | MCA + Zn | | | 10 | 3 | | 0.3 | | | 293 | 195 |
| 9 | MCA + Zn | | | 10 | 6 | | 0.3 | | | 288 | 187 |
| 10 | MCA + Zn | | 2 | 10 | | 0.3 | | | | 281 | 188 |
| 11 | MCA + Zn | | 2 | 10 | | | 0.3 | | 1 | 274 | 174 |
| 12 | MCA + Zn | 5 | | 10 | 3 | | 0.3 | | | 286 | 182 |
| 13 | MCA + Zn | 10 | | 10 | 3 | | 0.3 | | | 272 | 173 |
| 14 | MCA + Zn | | | 10 | 3 | 0.3 | | 3 | | 279 | 162 |
| 15 | none | | | | | 0.3 | | | | 347 | 218 |
| 16 | none | | | | | | | | | 370 | 237 |

*dosage of product, not calculated as active substance
**dosage calculated based on dry active substance Example 3

Test pulp slurry is prepared from old corrugated cardboard (OCC) based test liner packaging paper. Test liner paper is cut into 2×2 cm pieces. Dilution water comprises 50% test liner machine tray water and 50% tap water. Conductivity of tap water is adjusted to same level than in tray water by adding NaCl. Paper pieces are soaked in dilution water, which is heated to +50° C., for 10 min in 2% consistency. Wet disina constant stirring rate and a dry strength additive is added into the suspension. Stirring of test furnish is performed at 1000 rpm with propeller mixer. All sheets are dried in vacuum dryers 5 min at 1000 mbar pressure and at 92° C. temperature. After drying sheets are pre-conditioned for 24 h at 23° C. in 50% relative humidity. Sheet basis weight is 113 g/m² in air conditioned state. Basis weight is adjusted by cationic polyacrylamide (C-PAM) retention polymer dosage, to keep the retention constant.

Test chemical properties are described in Table 4. Following abbreviations are used: G-PAM is glyoxalated polyacrylamide; C-PAM-S is cationic polyacrylamide strength polymer; PEI is cross-linked fixative polymer with ethylene imine groups in the polymer backbone; Silica is colloidal silica in water solution, 15% solids content, particle size 5 nm, S-value 60; Ret C-PAM in cationic polyacrylamide retention polymer; A-PAM-D is anionic polyacrylamide dispersion retention polymer; A-PAM-S is anionic acrylamide strength polymer in water solution.

TABLE 4

Properties of used test chemicals.

| Chemical name | solids (%) | viscosity (cP) | MW average by weight (g/l) | Charge density at pH 7 (meq/g active polymer) | Form |
|---|---|---|---|---|---|
| G-PAM | 12.4 | 23 | 600 000 | 1.9 | water solution |
| C-PAM-S | 9.0 | 18700 | 700 000 | 1.1 | water solution |
| A-PAM-S | 20 | 6500 | 500 000 | −1.1 | water solution |
| PEI | 25 | 300 | 300 000 | 7.6 | water solution |
| Silica | 15 | | | | colloidal silica |
| Ret C-PAM | 95 | | 6 000 000 | 1.3 | powder |
| A-PAM-D | 20 | | 5 000 000 | −4.2 | salt dispersion |

Test chemical sequence is disclosed in Table 5. The sequence starts always with biocide addition if not otherwise stated.

TABLE 5

Test chemical sequence.

| Sample name | Test chemical sequence |
|---|---|
| Sample A | 1 Flocculating agent, no Coagulant agent, no biocide (reference) |
| Sample B | 1 Flocculating agent, no Coagulant agent, |
| Sample C | 1 Coagulant agent + 2 Flocculating agents |
| Sample D | 1 Strengthening agent + 1 Coagulant agent + 1 Flocculating agent |
| Sample E | 1 Strengthening agent + 1 Coagulant agent + 2 Flocculating agents |
| Sample F | 1 Strengthening agent + 1 Coagulant agent + 1 Flocculating agent + 1 Strengthening agent |
| Sample G | 1 Flocculant additive (fixative) + 1 Coagulant agent + 2 Flocculating agents |

Test program and addition times are shown in Table 6.

After hand sheet formation the obtained hand sheets are tested for various properties by using methods disclosed in Table 7. Starch content in the sheets is measured by slushing 4 g dried hand sheets into 200 ml water, to give 2° A) concentration, by using an immersion blender for 1 min. Slushed pulp slurry sample is then acidified to pH<3, typically to pH 2.5-2.9, with HCl, centrifuged 15 min, at 5 000 rpm, in a centrifuge (Megafuge 2.0, Heraeus Instruments) and filtered by 0.45 µm syringe filter (ACRODISC PSF Syringe Filters GxF/PVDF 0.45 µm, Pall). To a 50 ml flask is added 15 ml of filtrated sample, which is dyed with Iodine solution having 7.5 g/l of KI and 5 g/l $I_2$. Dye dose is 2.5 ml/sample, and 6.5 ml of 1% HCl is added to flask and the flask is filled to 50 ml mark with water. Absorbance is measured at 583 nm with a UV-spectrophotometer (Shimadzu UV-1800). Calibration solutions for starch concentration versus absorbance determination are prepared from Cargill C*Film TCF 70325 starch. Linear fitting line is made to correlate absorbance to starch content.

TABLE 6

Test program and addition times

| Chemical | −20 h Bocide | −120 s G-PAM (kg/t dry) | −120 s C-PAM-S (kg/t dry) | −120 s PEI (kg/t dry) | −20 s Silica (kg/t dry) | −10 s Ret C-PAM (kg/t dry) | −5 s A-PAM-D (kg/t dry) | −5 s A-PAM-S (kg/t dry) |
|---|---|---|---|---|---|---|---|---|
| Ref. Sample A | none | | | | | 0.15 | | |
| Ref. Sample B | MCA + Zn | | | | | 0.09 | | |
| Sample C | MCA + Zn | | | | 0.4 | 0.15 | 0.15 | |
| Sample D | MCA + Zn | 2 | | | 0.4 | | 0.15 | |
| Sample E | MCA + Zn | | 2 | | 0.4 | 0.09 | 0.15 | |
| Sample F | MCA + Zn | | 2 | | 0.4 | 0.15 | | 0.15 |
| Sample G | MCA + Zn | | | 0.8 | 0.4 | 0.09 | 0.15 | |

TABLE 7

Measured handsheet properties and standard methods used.

| Measured Property | Used Standard method & Device |
|---|---|
| Grammage | ISO 536, Mettler Toledo |
| Ash content | ISO 1762, Precisa PrepAsh 229 |
| Tensile strength | ISO 1924-3, Lorentzen & Wettre Tensile tester |
| Bursting strength | Tappi T 569, Lorentzen & Wettre Bursting strength tester |

Results for measurements of hand sheet properties are shown in Table 8. It can be seen that the starch content in the hand sheet is increasing when the addition sequence according to the invention is used in comparison to Reference Samples A and B. Increased starch content in hand sheets indicates also that the COD value in process water, which is discharged in thickening step or at sheet preparation, is decreased.

TABLE 8

Results for measurements of hand sheet properties.

|  | Starch in paper (Abs. value) | Starch in paper (g/t) | Tensile index (Nm/g) | Ash content (%) | Bursting strength (kPa) |
|---|---|---|---|---|---|
| Ref. Sample A | 0.021 | 307 | 28.8 | 13.3 | 165 |
| Ref. Sample B | 0.031 | 480 | 29.4 | 14.1 | 196 |
| Sample C | 0.055 | 897 | 30.0 | 15.7 | 194 |
| Sample D | 0.045 | 733 | 30.3 | 17.2 | 194 |
| Sample E | 0.050 | 811 | 31.2 | 17.0 | 213 |
| Sample F | 0.053 | 870 | 32.5 | 16.4 | 207 |
| Sample G | 0.057 | 932 | 28.8 | 17.0 | 179 |

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. A method for making paper, tissue, or board by using recycled fibre material comprising low molecular weight starch as a raw material, the method comprising the following steps:
    pulping the recycled fibre material in a pulper and obtaining a pulp flow comprising (i) an aqueous phase and (ii) at least recycled fibres and starch having low molecular weight, which are dispersed in the aqueous phase;
    adding a coagulant agent to the pulp flow or to an aqueous process flow comprising starch having low molecular weight;
    allowing the coagulant agent to interact with the starch having low molecular weight in the pulp flow or allowing the coagulant agent to interact with the starch having low molecular weight in the aqueous process flow and optionally forming aggregates;
    adding at least one flocculating agent, after the addition of the coagulant agent, to any flow, which comprises interacted coagulant agent, and forming a treated flow with starch comprising agglomerates;
    optionally combining the aqueous process flow, after the addition of the flocculating agent, with the pulp flow; and
    retaining at least part of the agglomerates and the optionally formed aggregates, where present, to the fibres or to a web, which is formed.

2. The method according to claim 1, wherein the COD value of the treated flow is reduced by at least 10% from the COD value of the aqueous phase of the pulp flow or from the COD value of the aqueous process flow into which the coagulant agent is added.

3. The method according to claim 1 further comprising
    screening the pulp flow and separating unwanted material from the pulp flow;
    a thickening step, wherein the screened pulp flow is thickened to a higher concentration by separating a part of the aqueous phase from the pulp flow as a discharge flow; and
    adding the coagulant agent to the pulp flow before the thickening step or to the discharge flow from the thickening step.

4. The method according to claim 3, further comprising:
    adding the coagulant agent to the discharge flow of the thickening step at one feeding location or more feeding locations, and
    leading the discharge flow from the thickening step onward and using it as dilution water between the machine chest and the headbox.

5. The method according to claim 1, further comprising:
    screening the pulp flow and separating unwanted material from the pulp flow; and
    adding coagulant immediately after the pulping step, before the screening step or after the screening step.

6. The method according to claim 1, further comprising selecting the coagulant agent from the group consisting of: aluminium sulphate, aluminium chloride, polyaluminium chloride (PAC), polyaluminium sulphate (PAS), polyaluminium silica sulphate, sodium aluminate, alum, ferric sulphate ($Fe_2(SO_4)_3$), ferrous sulphate ($FeSO_4$), ferric ferrous sulphate, ferric chloride, ferrous chloride, ferric ferrous chloride, ferric chloride sulphate, ferric nitrate, ferric sulphate nitrate, ferric chloride nitrate, ferric hydroxide, bentonite, colloidal silica, materials containing silica, and their mixture.

7. The method according to claim 6, further comprising selecting the coagulant agent from the group consisting of: bentonite, colloidal silica, aluminium compounds and iron compounds comprising Fe (III).

8. The method according to claim 1, further comprising adding flocculating agent to the pulp flow, which comprises interacted coagulant agent, after the pulp is led to a pulp storage tower or silos and before a headbox of a paper or board machine.

9. The method according to claim 1, further comprising adding the flocculating agent after the coagulant agent, the reaction time for the interaction between the coagulant agent and low molecular starch being >1 min, before the addition of the flocculating agent.

10. The method according to claim 1, further comprising selecting the flocculating agent from the group consisting of: cationic polyacrylamide (C-PAM), anionic polyacrylamide (A-PAM), polyvinyl amine (PVAm), polyethylene oxide (PEO), polyethyleneimine (PEI) and their mixtures.

11. The method according to claim 1, wherein the low molecular weight starch comprises an oxidised surface size starch having a weight average in the range of 100 000-5 000 000 g/mol.

12. The method according to claim 1, further comprising adding a biocide and/or an amylase enzyme inhibitor to the pulper and/or to a flow in the process, wherein the biocide reduces the number of viable bacteria and/or microbes in the flow by at least 80%.

13. The method according to claim 12, further comprising adding the biocide and/or the amylase enzyme inhibitor to the pulp flow within 2 hours from the moment when the pulp flow exits the pulper outlet.

14. The method according to claim 12, further comprising adding the biocide and/or the amylase enzyme inhibitor to the pulp between inlet of the pulper and thickening step of the screened pulp flow or adding the biocide and/or the amylase enzyme inhibitor to the pulp flow before a pulp storage towers or silos located after the thickening step.

15. The method according to claim 12, further comprising selecting the biocide from the group of oxidizing biocides consisting of: sodium hypochlorite, hypobromous acid, and chlorine dioxide; the group of halogenated hydantoins consisting of: bromochloro-dimethylhydantoin; the group of partially halogenated hydantoins consisting of: monochloro-dimethylhydantoin; the group of haloamines consisting of: chloramines and bromamines; and their mixtures.

16. The method according to claim 1, further comprising adding strengthening agents and/or flocculant additives to the pulp flow.

17. The method according to claim 16, further comprising selecting the strengthening agent from the group consisting of: starch, cationic polyacrylamide (C-PAM), anionic polyacrylamide (A-PAM), glyoxylated polyacrylamide (G-PAM), amphoteric polyacrylamide, polydiallyldimethylammonium chloride (poly-DADMAC), polyacrylic amide (PAAE), polyvinyl amine (PVAm), polyethylene oxide (PEO), polyethyleneimine (PEI), chitosan, guar gum, carboxymethyl cellulose (CMC) and their mixtures.

18. The method according to claim 16, further comprising selecting the flocculant additive from the group consisting of: bentonite, colloidal silica, and papermaking fixatives comprising polydiallyldimethylammonium chloride (poly-DADMAC) or polyamines, and adding the flocculant additive before or after the addition of the flocculating agent, but after the addition of the coagulant agent.

19. The method according to claim 1, further comprising pulping recycled paper, board and/or old corrugated containerboard (OCC), comprising starch, whereby the COD value of the aqueous phase of the untreated pulp flow is of >20 kg/ton, before the addition of the coagulant agent and the flocculating agent.

20. The method according to claim 1, wherein a fresh water consumption of the process is <10 $m^3$/ton produced paper or board and/or a process water conductivity at the headbox is >2500 µS/cm.

* * * * *